UNITED STATES PATENT OFFICE.

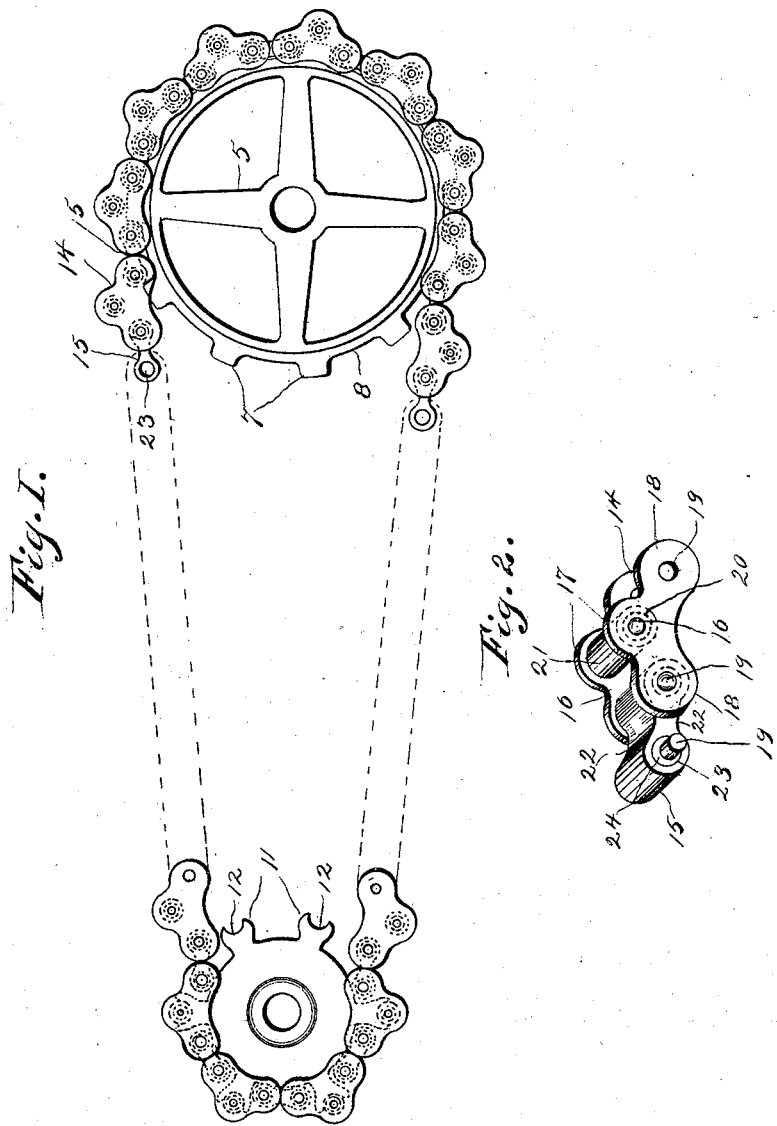

THOMAS HOLT, OF TARRYTOWN, NEW YORK.

DRIVE-CHAIN.

SPECIFICATION forming part of Letters Patent No. 628,939, dated July 18, 1899.

Application filed May 27, 1896. Serial No. 593,234. (No model.)

*To all whom it may concern:*

Be it known that I, THOMAS HOLT, a subject of the Queen of England, and a resident of Tarrytown, in the county of Westchester and State of New York, have invented certain new and useful Improvements in Drive-Chains for Bicycles and Similar Vehicles, of which the following is a specification, reference being had to the accompanying drawings, forming a part thereof, in which similar numerals of reference indicate corresponding parts.

This invention relates to drive-chains and sprocket-wheels for use in connection with bicycles and similar vehicles; and the object thereof is to provide an improved sprocket-wheel and an improved drive-chain for use in connection therewith whereby less friction is occasioned in the operation of the vehicle and greater speed secured by less application of power.

The invention is fully disclosed in the following specification, of which the accompanying drawings form a part, in which—

Figure 1 is a side view of the two sprocket-wheels usually employed in a bicycle or similar vehicle and showing my improved chain mounted thereon, and Fig. 2 is a perspective view of a portion of the chain.

In the drawings forming part of this specification I have shown at 5 a sprocket-wheel which is adapted to be mounted on the pedal-shaft and at 6 another sprocket-wheel which is adapted to be mounted on the shaft or axle of the drive-wheel of the vehicle.

The wheel 5 is provided at regular intervals on the perimeter thereof with sprockets 7, which are separated by predetermined spaces 8, and the wheel 6 is provided at regular intervals with outwardly-directed sprockets 10, having circular heads 11, in which are formed semicircular recesses 12.

The wheel 6 is preferably provided with six of the sprockets 10, and the spaces between said sprockets are preferably about twice the width of the sprockets at the base thereof, and I also provide a drive-chain which is composed of two separate links 14 and 15, and the links 15 are merely connecting-links and serve to connect the links 14, which constitute the main links of the chain.

The links 14 are each composed of two similar side plates 16, and said side plates 16 are concave on the inner edges and provided centrally of their outer edges with circular lugs or projections 17, and the ends thereof are also circular in form, as shown at 18, and the ends of the separate side plates 16 are connected by transverse pins 19, which pass therethrough, and the circular lugs or projections 17 are connected by transverse pins 20, on which is mounted a roller 21.

The connecting-links 15 are oblong in form, as clearly shown in Fig. 2, and the top and bottom thereof are cut out, so as to form transverse grooves, as shown at 22, and the ends are provided with transverse circular bores or passages 23, through which the pins 19 pass, and the body portions of said pins are larger than the ends thereof, whereby annular shoulders 24 are formed, which abut against the inner sides of the plates 16 of the links 14.

The rollers 21 are designed to serve as antifriction-rollers, and the links 15 may also be loosely mounted on the pins 19 or on the enlarged central portions 24 thereof, and thus the friction may be still further diminished, and in operation the sprockets 7 on the wheel 5 pass between the ends of the connecting-links 15 and between the side plates 16 of the links 14, as shown in Fig. 1, and said connecting-links pass between said sprockets, and the antifriction-rollers 21 of the links 14 enter the semicircular or segmental notches or recesses 12 in the sprockets, and the circular projections 13 enter the transverse grooves or recesses 22 in the connecting-links, as is clearly shown at the left of Fig. 1, and said sprockets 10 on the wheel 6 pass between the side plates 16 of the links 14. By means of this construction it is almost impossible to disconnect the drive-chain from the sprocket-wheels when once properly placed thereon and there is no danger of said sprocket-chains becoming detached in the operation of the vehicle. The friction is also, as will be apparent, reduced to a minimum by reason of this construction.

It is evident that my improved drive-chain and sprocket-wheel may be used in connection with other forms of mechanism as well as upon bicycles and similar vehicles, and Having fully described the invention, I claim and desire to secure by Letters Patent—

The combination with a sprocket-wheel provided with outwardly-directed sprockets 10 having circular heads 11, in which are formed semicircular recesses 12, of a drive-chain composed of connecting-links 15, the ends thereof being provided with transverse bores, and side plates 16 concave on the inner edges and provided with central outwardly-directed lugs 17, antifriction-rollers 21 journaled between said lugs, said side pieces having semicircular lugs or projections provided with a central bore and pins adapted to pass through said bore and through the bores of the connecting-links, said antifriction-rollers being adapted to engage the semicircular recesses in the projections on said sprocket-wheel to reduce the friction and to prevent disengagement of the chain from the wheel, substantially as described.

In testimony that I claim the foregoing as my invention I have signed my name, in presence of the subscribing witnesses, this 21st day of May, 1896.

THOMAS HOLT.

Witnesses:
C. GERST,
B. RHEDA.